G. DALEN.
INCANDESCENT GAS LAMP.
APPLICATION FILED NOV. 14, 1916.
1,315,817.
Patented Sept. 9, 1919.
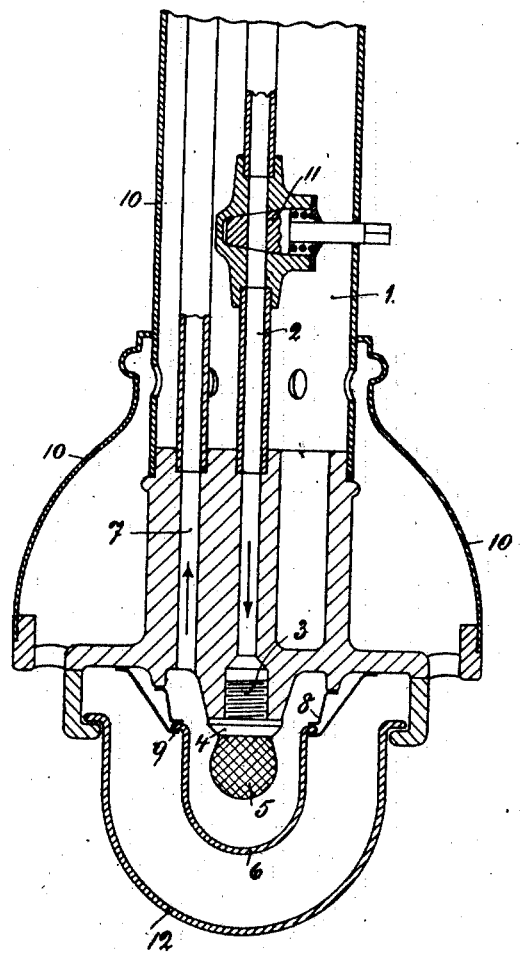
Inventor:
G. Dalen

UNITED STATES PATENT OFFICE.

GUSTAF DALÉN, OF LIDINGÖN, STOCKHOLM, SWEDEN, ASSIGNOR TO SVENSKA AKTIEBOLAGET GASACCUMULATOR, OF STOCKHOLM, SWEDEN.

INCANDESCENT GAS-LAMP.

1,315,817.  Specification of Letters Patent.  Patented Sept. 9, 1919.

Application filed November 14, 1916. Serial No. 131,188.

*To all whom it may concern:*

Be it known that I, GUSTAF DALÉN, engineer, residing at Skärsätra, Lidingön, Stockholm, Sweden, have invented certain new and useful Improvements in Incandescent Gas-Lamps, of which the following is a specification.

In incandescent gas lamps the incandescent mantle usually is surrounded by a glass globe, to the interior of which the atmospheric air has a free entrance and from which the combustion gases, especially when the lamp in question is adapted for lighting railway carriages, escape through a chimney, the construction of which is more or less voluminous and complicated. The air supply to the interior of said glass globe mainly has for object to admit the necessary air of combustion to the incandescent mantle. The said chimney for carrying away the combustion gases however in some cases occasions many inconveniences, as the lamp only can be mounted on such places, where it is possible to arrange the chimney opening into the atmosphere. Moreover said chimney is very expensive and occupies a very large place.

The present invention has for its object to avoid these inconveniences by conducting away the gases of combustion under pressure from the interior of the glass globe through a common pipe conduction, which may be only slightly thicker than the gas supply pipe, and thus may be conducted to the atmosphere from any place, where the lamp is desired to be applied. In order to obtain the necessary pressure in the interior of the lamp globe said interior is hermetically closed to the atmosphere, and the mixture of gas and air is supplied to the burner under pressure.

On the drawing a vertical section of the lower part of the gas lamp according to this invention is shown.

1 indicates the lamp casing, in which is arranged a supply pipe 2 for gas and air mixture, containing air in such a proportion as to establish a complete combustion both in the burner and at the incandescent mantle. Such gas air mixture may be generated in any suitable apparatus for preparing a gas and air mixture in predetermined proportions under pressure. At the end of said casing the burner 3 and the holder 4 for the incandescent mantle 5 are provided. The holder 4 is adapted for an invert incandescent body in the usual manner.

Surrounding the incandescent mantle 5 is provided a globe 6, which is hermetically fixed in any suitable manner to the lamp casing 1, as by means of flanges 8, 9 on said casing, between which the globe is tightly fixed. In the lamp casing is arranged an outlet pipe 7, communicating with the interior of the lamp globe and leading out to the atmosphere. In other regards the interior of the lamp globe is hermetically closed. Through the outlet casing 10 circulating air may be conducted if desired. 11 indicates a valve or cock, by means of which the supply of gas and air mixture to the burner 3 may be opened or closed.

It will be clear from the specification above that no additional air is supplied neither to the burner nor to the incandescent mantle, as hitherto usually has been the case, but that the whole quantity of air, necessary to obtain a complete combustion both in the burner and at the incandescent mantle is present in the gas and air mixture, supplied through the conduit 2. Said gas and air mixture is prepared in predetermined proportions and is supplied under pressure, and as the globe 6 is hermetically closed against the atmosphere a pressure above that of the atmosphere is prevailing in the interior of the globe 6, so that the gases of combustion are forced out under pressure from said interior against the pressure of the atmosphere through the outlet pipe 7. The gas lamp thus is provided only with a supply pipe 2 for gas and air mixture, and with an outlet pipe 7 for the gases of combustion.

12 indicates an outer glass globe, surrounding the inner globe 6 and suspended in the usual manner on the lamp casing.

What I claim as my invention is:

In combination, a hollow casing provided at one end with a fitting having an inlet bore and an exhaust bore, a pipe located in the casing and connected to the inlet bore for conducting air and gas in predetermined proportions, and under pressure, to said inlet bore, a burner connected with the inlet bore, a mantle into which the burner opens, a globe surrounding the mantle, the outlet bore being the only means of placing the interior of the globe in communication with the atmosphere, and a pipe located in the casing and connected to the outlet bore of the fitting for conducting the products of combustion away from the globe under the pressure arising from the pressure of the incoming air and gas.

In testimony whereof I have signed my name to this specification in the presence of two subscribing witnesses.

GUSTAF DALÉN.

Witnesses:
WALDEMAR BOMAN,
GRETA PRIEN.

Copies of this patent may be obtained for five cents each, by addressing the "Commissioner of Patents, Washington, D. C."